United States Patent [19]
Chang

[11] Patent Number: 5,553,970
[45] Date of Patent: Sep. 10, 1996

[54] WATER-SAVING IRRIGATION DEVICE

[76] Inventor: Yuan-Liang Chang, No. 34, Lan-Jou St., Chung-Li City, Tao Yuan, Taiwan

[21] Appl. No.: 489,425

[22] Filed: Jun. 12, 1995

[51] Int. Cl.⁶ .............................. A01G 29/00; E02B 13/00
[52] U.S. Cl. .................. 47/48.5; 405/36; 405/39; 405/40
[58] Field of Search .................. 405/36, 39, 40, 405/50; 47/48.5 G

[56] References Cited

U.S. PATENT DOCUMENTS 1,439,973  12/1922  Olson .......................................... 405/36

Primary Examiner—Michael Powell Buiz
Assistant Examiner—Tara L. Mayo
Attorney, Agent, or Firm—Morton J. Rosenberg; David I. Klein

[57] ABSTRACT

A water-saving irrigation device of the type that is utilized for the irrigation of vegetation and trees in arid desert areas is provided. The irrigation device includes a water inlet port, a water outlet port and a water storage container. The water inlet port is positioned at the upper section of the water storage container, attached to the cover and the water input nozzle of the water storage container. The water outlet port is positioned at either the lower section or the lateral section of the water storage container. The water outlet port has a perforated cover plate mounted against a sediment trap layer disposed within a water output nozzle. The sediment layer can be constructed from fine fabric or interwoven fibers. An air volume adjustment device is installed on the cover plate of water inlet port to control the amount of air admitted into the water storage container.

6 Claims, 2 Drawing Sheets

WATER-SAVING IRRIGATION DEVICE

BACKGROUND OF THE INVENTION

The invention herein consists of a kind of water-saving irrigation device, specifically a kind that is utilized for the irrigation of flora planted in arid desert areas.

The global survival environment continues to worsen, with the growing size of deserts posing a special concern to mankind. However, various methods are available to allow people to reclaim dry desert regions into arable land suitable for planting and re-forestation and thereby improve the existent environment. For example, Israel has utilized drip-irrigation systems, while Japan has developed plastic granules with airborne water absorption and retention qualities that are mixed into sand as well as moisture preservation solutions which support vegetative growth. However, drip-irrigation systems require massive investment, which limits the scale of implementation. The utilization of airborne water absorption and retention granules and moisture preservation solutions are high cost measures and the application variables are too inconsistent for practical use in arid desert regions characterized by high rates of evaporation.

The primary objective of the invention herein is to provide a kind of water-saving irrigation device that overcomes the disadvantages of aforementioned existent technologies, is low in cost, supports irrigation with a minimum evaporative loss and is not difficult to install in large scale within substantial expanses of arid desert regions.

The objectives of the invention herein are fully exemplified in the brief description of the drawings attached immediately below and the detailed description of the invention immediate following.

Figure 1:
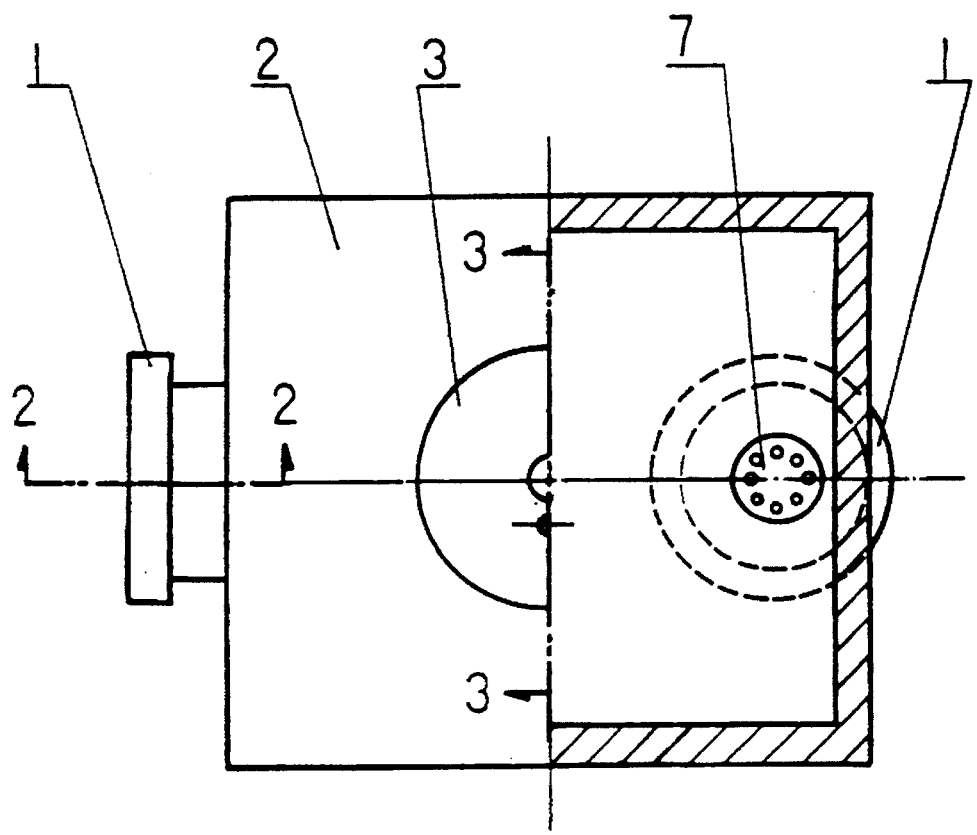
FIG. 1 is a partial cross-sectional drawing of the structure of the invention herein.
Figure 3:
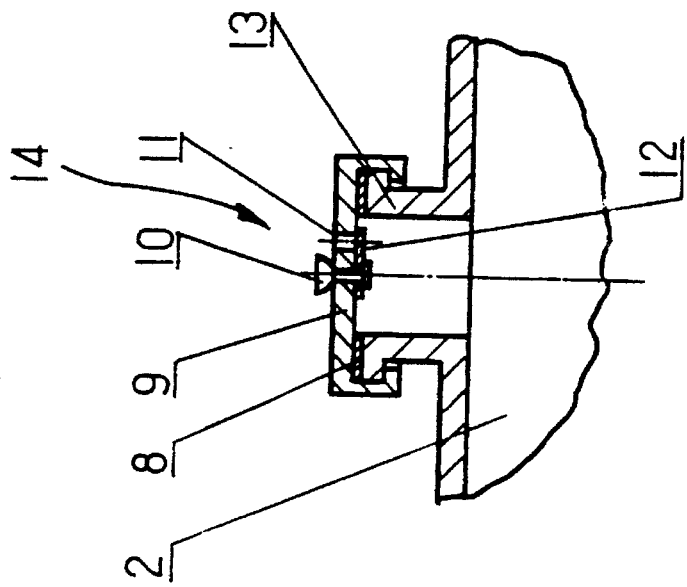
FIG. 3 is a cross-sectional drawing of the section delineated by line A—A.
Figure 2:
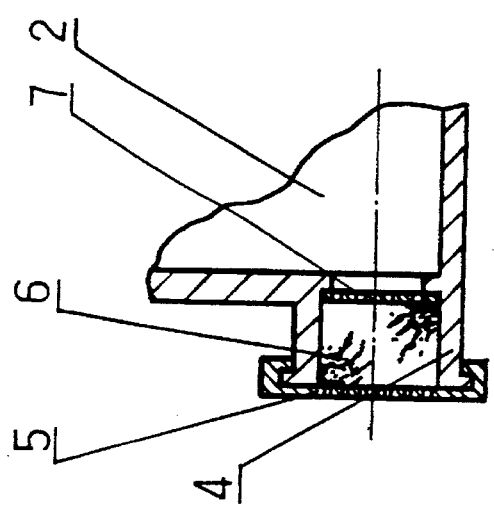
FIG. 2 is a cross-sectional drawing illustrating the rotation of cross sections delineated by line B—B and line C—C.

| 1-Water outlet port. | 2-Water storage container. |
|---|---|
| 3-Water inlet port. | 4-Water output nozzle. |
| 5-Perforated cover plate. | 6-Sediment trap layer. |
| 7-Perforated backing plate. | 8-Gasket. |
| 9-Cover plate. | 10-Adjustment button. |
| 11-Air bleed hole. | 12-Hole check plate. |
| 13-Water input nozzle. | |

DETAILED DESCRIPTION OF THE INVENTION

The water-saving irrigation device of the invention herein is mainly comprised of a water inlet port (3), a water outlet port (1) and a water storage container (2), of which the aforesaid water outlet port (1) is positioned on the lower section or the lateral section of the water storage container (2) and, furthermore, there is a perforated cover plate (5) that secures a sediment trap layer (6) against a water output nozzle (4).

Furthermore, the invention herein includes a perforated backing plate (7) that is positioned in between the sediment trap layer (6) of the water outlet port (1) and the water storage container (2), which enables the aforesaid sediment trap layer (6) to remain in the original shape and thereby function with maximum efficiency. Furthermore, the sediment trap layer (6) can consist of a layer of fine fabric, a layer of interwoven fiber or an infiltration element.

The objectives of the invention herein can be achieved through the following method of application: The cover plate (9) of the aforesaid water inlet port (3) is configured into sealed conjoinment through a gasket (8) seated on the water input nozzle (3) and, furthermore, an air volume adjustment device (10), (11) and (12) is on the cover plate (9), wherein the air volume adjustment device (10), (11) and (12) in the embodiment of the invention herein consists of an air bleed hole (11) and a hole check plate (12) fabricated into the cover plate (9) and, furthermore, the aforesaid hole check plate (12) includes an integrated an adjustment button (10) that is similarly a part of the overall installation of the aforesaid air volume adjustment device on the cover plate (9), wherein the adjustment button (10) enables the incremental movement of the hole check plate (12) that governs the degree of admissibility through the air bleed hole (11) such that the volume of air admitted into the aforesaid storage container (2) can be controlled through adjustment and thereby achieve the objective of adjusting the volume of stored water that is emitted. Obviously, a needle valve or other equivalent structural fixture can also be utilized in lieu of the air volume adjustment device of the invention herein to achieve the aforesaid objective.

The invention herein can be constructed of plastic material, especially the plastic material recovered through recycling waste of plastic waste and, furthermore, the design of the water storage container (2) can be fabricated in various shapes and dimensions according to different regional utilization requirements and, furthermore, the design of the water outlet port (1) can be such that the invention herein can have one or a number of the aforesaid water outlet ports.

When the invention herein is utilized, the water-saving irrigation device is buried in the root zone of the targeted flora, with the thickness of the sediment trap layer as well as the throughput of the air volume adjustment device set according to the actual site conditions and, furthermore, the periodic refilling of the water Storage container (2). During utilization, an external protective hood can be installed onto the water outlet port (1) as required.

In summation of the foregoing description, the water-saving irrigation device of the invention offers the following advantages:

1. Low production cost and a wide scope of application, especially in arid desert regions, where the invention herein prevents dehydration due to the evaporation of water and thereby protects plant life.

2. Extremely simple construction and, furthermore, the invention herein can be manufactured out of recycled plastic waste, which further reduces production costs, while providing a new way of utilizing recycled plastic materials.

3. Convenient to utilize and periodically refillable with water, the invention herein, furthermore, features a variable sediment trap layer or (and) air volume adjustment device that provides for an adjustable volume of emitted water, which thereby achieve the object of conserving water and ease of mass installation in arid desert areas.

What is claimed is:

1. A water-saving irrigation device comprising:

a water inlet port and a water outlet port coupled in fluid communication to a water storage container, said water outlet port being positioned on a lower or lateral portion of said water storage container, said water outlet port including a water output nozzle, a sediment trap layer disposed within said water outlet nozzle, and a perforated cover plate for securing said sediment trap layer within said water output nozzle.

2. The device as recited in claim 1, where said water outlet port includes a perforated backing plate positioned between said sediment trap layer and said water storage container.

3. The device as recited in claim 1 where said water inlet port includes a water input nozzle, a cover plate disposed in sealed conjointment with a gasket seated on said water input nozzle and an air volume adjustment device formed on said cover plate.

4. The device as recited in claim 1 or claim 2 where said sediment trap layer is formed by one of a layer of fine fabric, a layer of interwoven fiber or an infiltration element.

5. The device as recited in claim 3 where said air volume adjustment device includes a hole check plate displaceably coupled to said water inlet port cover plate in aligned relationship with an air bleed hole formed in said cover plate and displaceable therefrom, said hole check plate including an integrally formed adjustment button extending through said water inlet port cover plate.

6. The device as recited in claim 1 further comprising a protective hood installed on an external portion of said water outlet port.

* * * * *